US010131111B2

(12) United States Patent
McGarry et al.

(10) Patent No.: US 10,131,111 B2
(45) Date of Patent: Nov. 20, 2018

(54) STRUCTURAL WELD PATTERN

(71) Applicants: John McGarry, Clinton, IA (US);
Jason George, Clinton, IA (US);
Dennis Behr, Clinton, IA (US); Daniel E. Koranda, Clinton, IA (US); Duane Diedrich, Charlotte, IA (US)

(72) Inventors: John McGarry, Clinton, IA (US);
Jason George, Clinton, IA (US);
Dennis Behr, Clinton, IA (US); Daniel E. Koranda, Clinton, IA (US); Duane Diedrich, Charlotte, IA (US)

(73) Assignee: Custom-Pak, Inc., Clinton, IA (US)

( * ) Notice: Subject to any disclaimer, the term of this patent is extended or adjusted under 35 U.S.C. 154(b) by 233 days.

(21) Appl. No.: 15/170,116

(22) Filed: Jun. 1, 2016

(65) Prior Publication Data

US 2017/0348942 A1 Dec. 7, 2017

(51) Int. Cl.
*B32B 3/28* (2006.01)
*B29C 49/00* (2006.01)
*B29C 49/42* (2006.01)
*B32B 3/26* (2006.01)
*B32B 7/08* (2006.01)
*B32B 7/04* (2006.01)
*B32B 1/02* (2006.01)
*B32B 3/06* (2006.01)
*B32B 3/00* (2006.01)
*B32B 3/14* (2006.01)
*B32B 3/30* (2006.01)
*B29L 7/00* (2006.01)

(52) U.S. Cl.
CPC ............ *B32B 3/28* (2013.01); *B29C 49/0084* (2013.01); *B29C 49/4273* (2013.01); *B32B 1/02* (2013.01); *B32B 3/00* (2013.01); *B32B 3/06* (2013.01); *B32B 3/14* (2013.01); *B32B 3/266* (2013.01); *B32B 3/30* (2013.01); *B32B 7/045* (2013.01); *B32B 7/08* (2013.01); *B29L 2007/00* (2013.01); *B32B 2250/02* (2013.01); *B32B 2250/24* (2013.01); *B32B 2439/00* (2013.01)

(58) Field of Classification Search
CPC .... B32B 1/02; B32B 1/08; B32B 3/00; B32B 3/06; B32B 3/14; B32B 3/266; B32B 3/28; B32B 3/30; B32B 7/045
See application file for complete search history.

(56) References Cited

U.S. PATENT DOCUMENTS

| | | |
|---|---|---|
| 8,302,541 B2 | 11/2012 | Haney et al. |
| D671,773 S | 12/2012 | Johnson et al. |
| D671,775 S | 12/2012 | Clegg et al. |
| D671,776 S | 12/2012 | Clegg et al. |
| D672,175 S | 12/2012 | Peery et al. |
| 8,342,107 B2 | 1/2013 | Mower et al. |
| 8,347,795 B2 | 1/2013 | Peery et al. |
| 8,375,871 B2 | 2/2013 | Stanford |
| 8,381,666 B2 | 2/2013 | Stanford |
| 8,397,652 B2 | 3/2013 | Peery et al. |
| 8,397,653 B2 | 3/2013 | Ashby et al. |
| 8,408,146 B2 | 4/2013 | Peery et al. |
| D681,982 S | 5/2013 | Clegg et al. |
| D682,586 S | 5/2013 | Clegg et al. |

(Continued)

*Primary Examiner* — Walter Aughenbaugh
(74) *Attorney, Agent, or Firm* — St. Onge Steward Johnston & Reens, LLC

(57) ABSTRACT

A blow molded structure and having ribs formed therein, the ribs defined by a recess in one wall of the blow molded structure that defines two sidewalls on either side of a joint, the joint being a weld between the two opposing walls of the blow molded structure. The ribs are arranged in intersecting paths and a passage is defined in the interior cavity of the blow molded structure at the intersection of two ribs such that fluid flows through the passage during molding.

21 Claims, 7 Drawing Sheets

(56) References Cited

U.S. PATENT DOCUMENTS

| | | |
|---|---|---|
| 8,438,982 B2 | 5/2013 | Stanford |
| D683,985 S | 6/2013 | Nye et al. |
| D688,496 S | 8/2013 | Bennett |
| 8,534,205 B1 | 9/2013 | Johnson et al. |
| 8,544,393 B2 | 10/2013 | Branch et al. |
| 8,555,789 B2 | 10/2013 | Jin et al. |
| 8,555,790 B2 | 10/2013 | Winter et al. |
| 8,555,791 B2 | 10/2013 | Jin et al. |
| 8,573,139 B2 | 11/2013 | Ashby et al. |
| 8,578,863 B2 | 11/2013 | Peery et al. |
| 8,578,865 B2 | 11/2013 | Haney et al. |
| D696,882 S | 1/2014 | Clegg et al. |
| 8,622,007 B2 | 1/2014 | Peery et al. |
| 8,683,929 B2 | 4/2014 | Peery et al. |
| 8,720,990 B2 | 5/2014 | Boydston |
| 8,726,817 B2 | 5/2014 | Bennett et al. |
| 8,739,707 B2 | 6/2014 | Stanford |
| 8,746,155 B2 | 6/2014 | Haney et al. |
| 8,757,069 B2 | 6/2014 | Peery et al. |
| D708,462 S | 7/2014 | Nye et al. |
| D715,081 S | 10/2014 | Bennett |
| 8,857,349 B2 | 10/2014 | Peery et al. |
| 8,904,623 B2 | 12/2014 | Stanford |
| 8,904,943 B2 | 12/2014 | Jin et al. |
| 8,943,982 B2 | 2/2015 | Peery et al. |
| D727,074 S | 4/2015 | Johnson et al. |
| 8,997,663 B2 | 4/2015 | Peery et al. |
| D733,475 S | 7/2015 | Johnson et al. |
| D734,081 S | 7/2015 | Johnson et al. |
| 9,101,209 B2 | 8/2015 | Bennett et al. |
| D739,672 S | 9/2015 | Johnson et al. |
| D739,673 S | 9/2015 | Johnson et al. |
| 9,138,050 B2 | 9/2015 | Peery et al. |
| D742,671 S | 11/2015 | Johnson et al. |
| 9,173,482 B2 | 11/2015 | Peery et al. |

STRUCTURAL WELD PATTERN

FIELD OF THE INVENTION

The following relates to a blow molded article that includes structural patterns to increase rigidity. More particularly, the following relates to a structural pattern that allows for fluid flow within the interior of the blow molded article during molding to provide desired wall thicknesses and ease and repeatability of manufacture while providing improved bending and wall deflection resistance.

BACKGROUND OF THE INVENTION

Blow molded articles provide a cost advantage over many articles that are formed of metal or other materials in that they are less expensive to manufacture and material costs are typically less. Further, the plastic can be recycled more easily providing environmental benefits. However, in some applications using prior blow molding techniques, panels often lacked the required local and overall rigidity that could accomplished with a metal structure. For example, a blow molded tray would normally have bottom and top surfaces connected by side walls, the side walls being smaller in surface area/height. As the blow molded article is increased in size, the distance between the side walls increases and the individual walls corresponding to the top and bottom surfaces will begin to deform more and more as loads are placed thereon.

One solution to this problem is to provide for increased wall thickness, which may thereby reduce localized bending (i.e. buckling of the walls). However, this solution has limits because as the wall thickness increases, so to do costs.

In addition, structural components of blow molded articles need to account for the necessity that fluid (such as air) needs to flow within the cavity of the article during molding to force the heated plastic against the mold surfaces and provide the desired shape. Restriction of fluid flow could also cause wall thinning beyond what is acceptable in the part design.

What is therefore desired is an improved structural component of a blow molded article which provides for appropriate wall thicknesses and reduces localized bending of walls and increases the overall strength and/or rigidity of the part.

SUMMARY OF THE INVENTION

It is therefore an object of the invention to provide a weld pattern in a blow molded article that improves localized stiffness and/or strength.

It is a further object of the invention to provide a weld pattern in a blow molded article that improves overall stiffness and/or strength.

It is yet a further object of the invention to provide a weld pattern that enables fluid to flow within the cavity of the blow molded article during molding to provide for desired control of molding properties including wall thickness.

These and other objects are achieved by providing a blow molded structure having ribs formed therein, the ribs defined by a recess in one wall of the blow molded structure that defines two sidewalls on either side of a joint, the joint being a weld between two opposing walls of the blow molded structure. The ribs are arranged in intersecting paths and a passage is defined in the interior cavity of the blow molded structure at the intersection of two ribs such that fluid flows through the passage during molding.

As used in herein, the terms "first" and "second" are used to distinguish one element, set, object or thing from another, and are not used to designate relative position or arrangement in time.

In one aspect a blow molded structure is provided and the structure includes a first wall and a second wall. A cavity is located between the first and second walls and defines an interior of the blow molded structure. A first rib is defined by an indent in the second wall and includes a first section where interior surfaces of the first and second walls are in contact, the first rib further defines an interior sidewall adjacent to the first section. A second rib is arranged transverse to the first rib. The second rib is defined by another indent in the second wall and includes a second section where the interior surfaces of the first and second walls are in contact. The second rib defines an interior end wall adjacent to the second section. A passage is defined within the cavity and is located between the first and second sections. A cross section of the passage is bounded at least by an interior of the first wall, the interior sidewall and an interior end wall of the second rib.

In some embodiments the interior surfaces of the first and second walls at the first and second sections are joined together to create joints and in some embodiments, the joints are plastic welds.

In other embodiments, the structure includes a plurality of first ribs arranged parallel to each other and a plurality of second ribs also arranged parallel to each other. A plurality of passages are each defined where one of the plurality of first ribs and one of the plurality of second ribs intersect.

In other embodiments at least one recess is positioned in the first wall, the second wall or combinations thereof. The at least one recess defines a wall and an opening. The recess is configured to receive a metallic insert therein, the metallic insert having a threaded bore and external threads, the external threads configured to thread into the wall via the opening. In some embodiments the blow molded structure includes at least two recesses, one positioned in the first wall and one positioned in the second wall. Each of the recesses is configured to receive one of at least two metallic inserts therein. In one embodiment, the recess is spaced away from the plurality of first ribs and the plurality of second ribs and includes a cylindrical wall.

In some embodiments a first length of the first rib defined as a length of the first section, which is greater than a width of the first section and a second length of the second rib defined as a length of the second section, which is greater that a width of the second section. In one embodiment, two of the second ribs are spaced apart a distance greater than the second length and less than two thirds the first length. In one embodiment the first length is at least three times larger than the second length.

In yet further embodiments, a method is provided for molding a blow molded structure with improved rigidity. The method may include one or more of the steps of providing a mold having two mold sections each defining a mold surface and a mold surface perimeter; arranging the two mold sections such that such that the mold surfaces are facing each other placing a parison between the two mold sections; and introducing fluid into the parison to expand the parison wherein opposing walls of the parison are pressed together in at least first and second locations to respectively create first and second ribs, the first and second ribs respectively aligned along first and second paths which intersect, the first rib defining a side wall and the fluid flowing substantially unobstructed along the side wall through a location where the first and second paths intersect.

In some embodiments the pressed together opposing walls creates a weld joining the opposing walls together. In other embodiments the fluid flows substantially unobstructed along an entire length of the first rib.

In other embodiments the second rib defines an end wall facing the side wall and a passage is defined by the end wall, side wall and an interior wall of the parison. In other embodiments at least two recesses are positioned in opposing walls of the blow molded structure, each of the at least two recesses having a wall and an opening. In yet other embodiments, the method includes the step of threading a metallic insert into each of the at least two recesses, the metallic insert including internal and external threads, the external threads threading into the wall of the corresponding one of the at least two recesses. In other embodiments, the recess is spaced apart from the first and second ribs, wherein the metallic insert includes external and internal threads, the external threads threading into the wall. In other embodiments, the method includes the step of affixing the blow molded structure to a part via the metallic insert by threading a bolt into the internal threads.

In still other embodiments the blow molded structure includes a plurality of the first and the second ribs, each of the second ribs intersecting at least one of the plurality of first ribs, and wherein the fluid flows substantially unobstructed along the wall of the at least one of the plurality of first ribs.

Other objects of the invention and its particular features and advantages will become more apparent from consideration of the following drawings and accompanying detailed description.

DETAILED DESCRIPTION OF THE INVENTION

Figure 1:
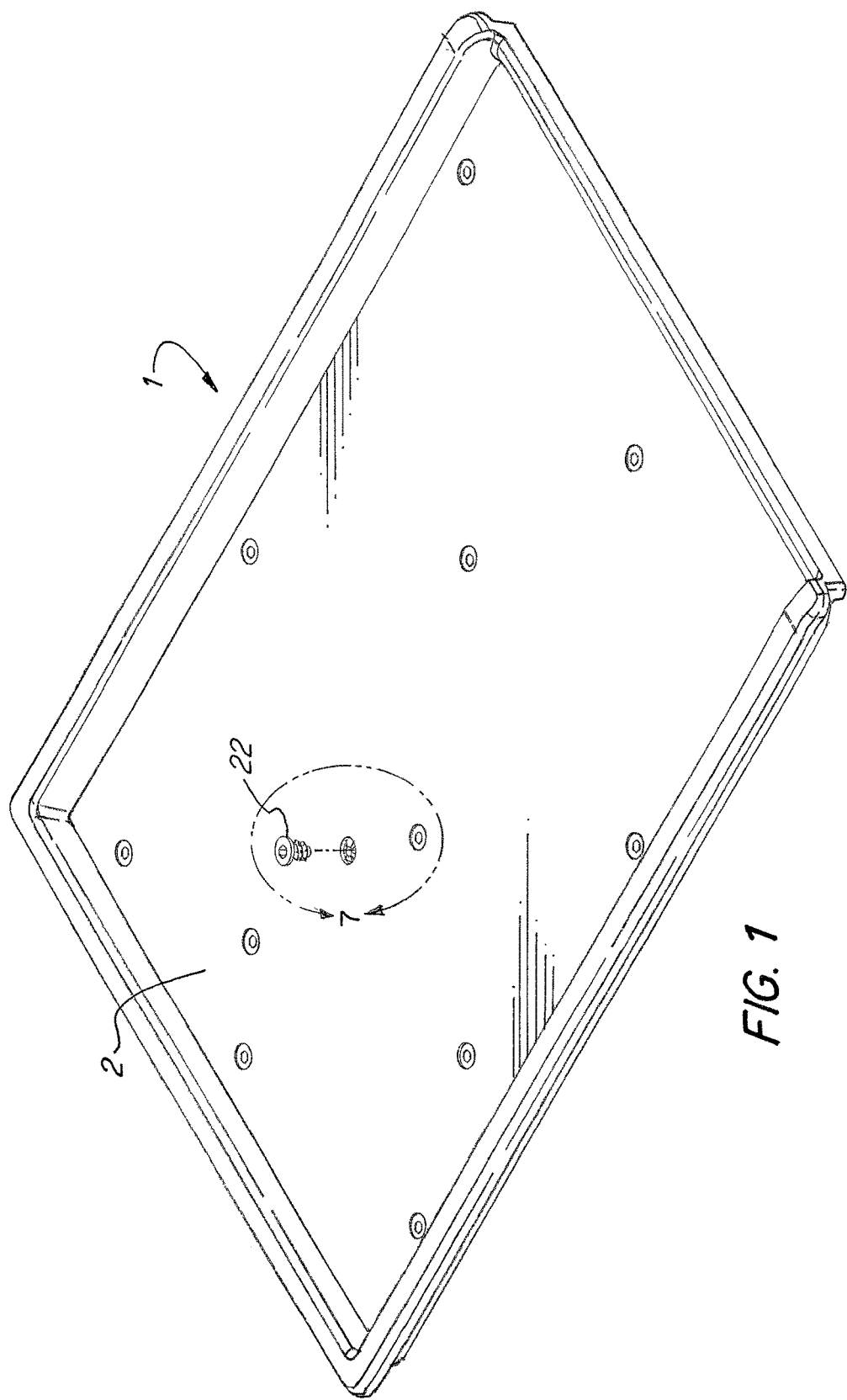
FIG. 1 is a top perspective view of a blow molded part.
Figure 2:
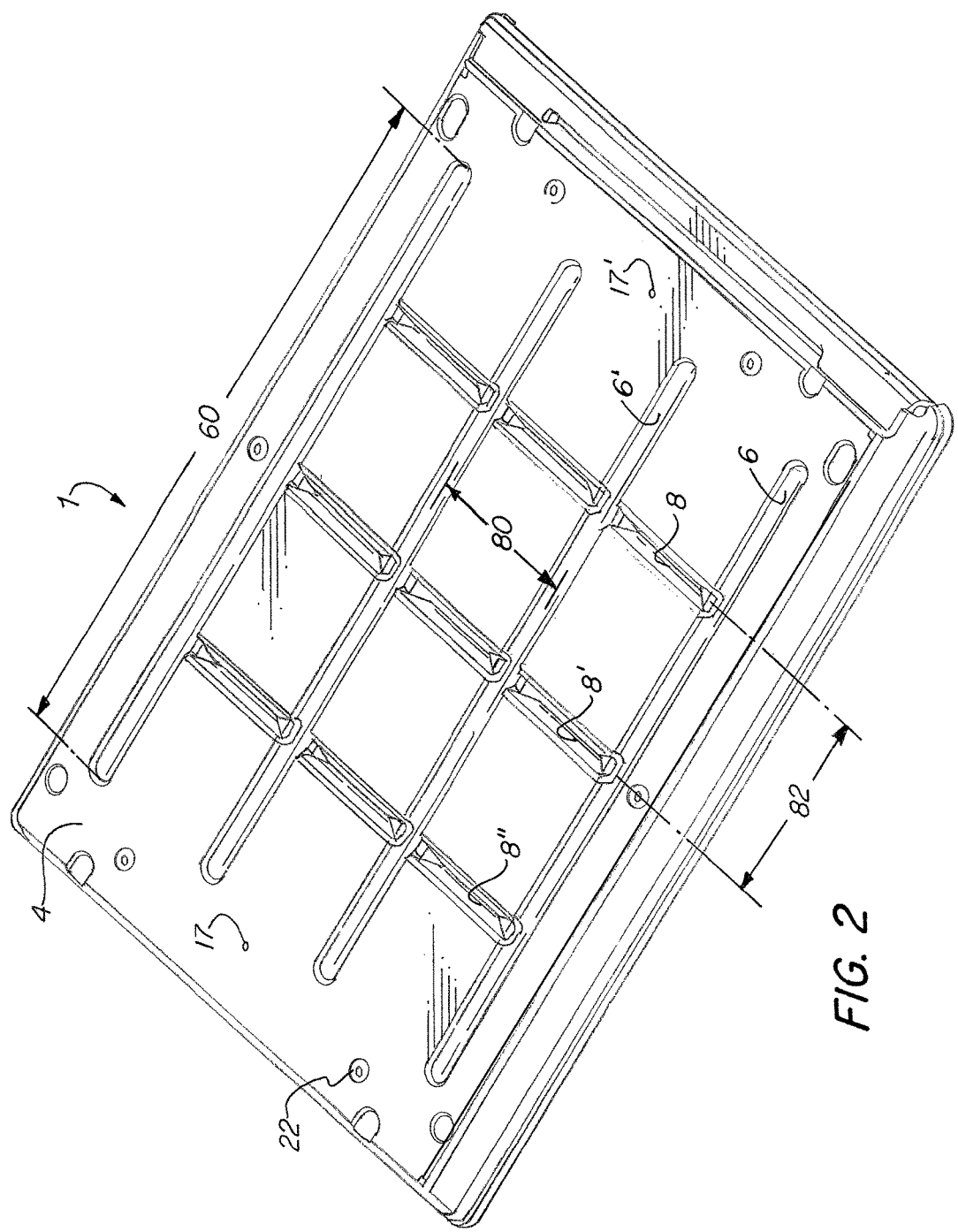
FIG. 2 is bottom perspective view of the blow molded part of FIG. 1
Figure 3:
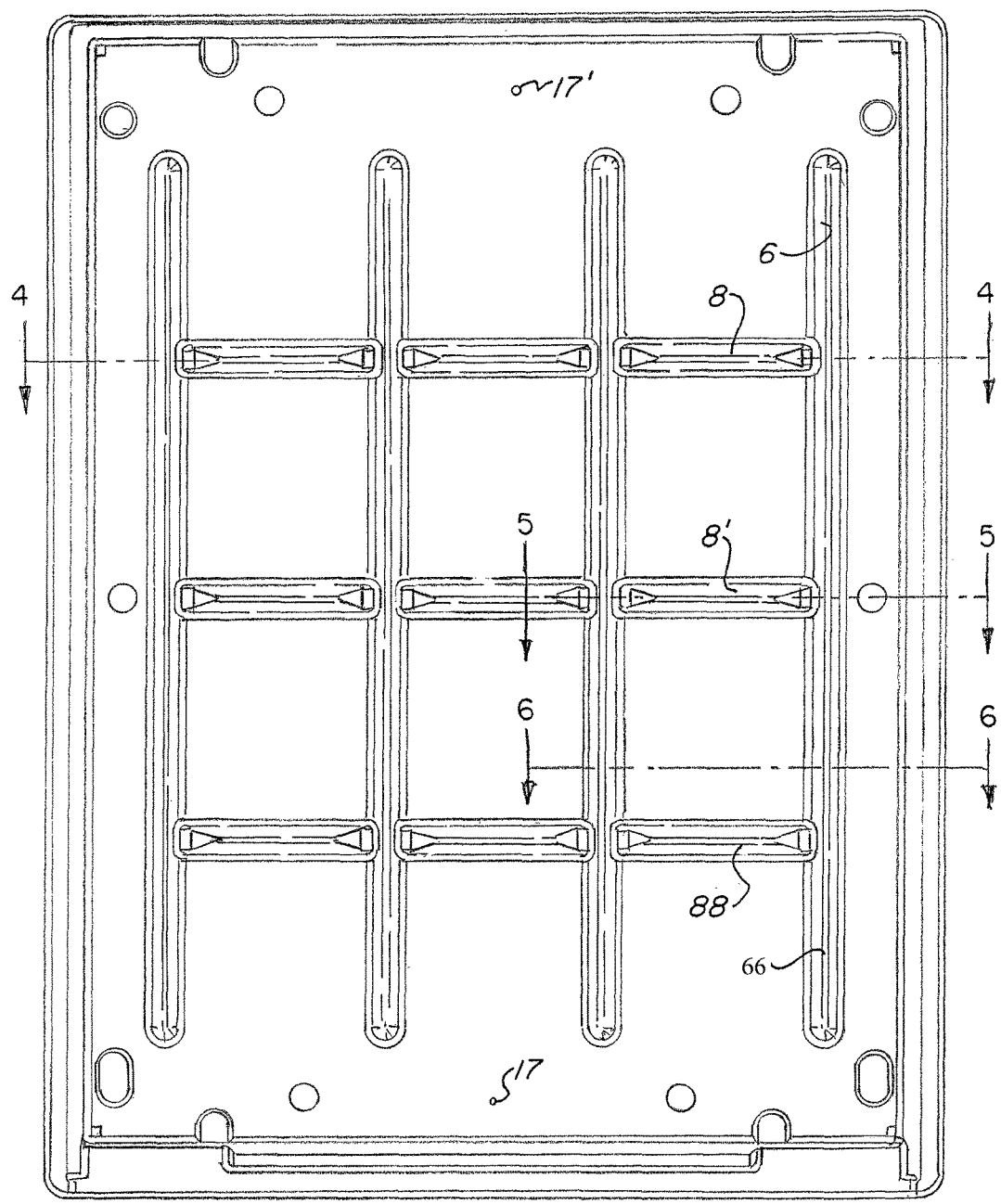
FIG. 3 is a bottom view of the blow molded part of FIG. 1
Figure 4:
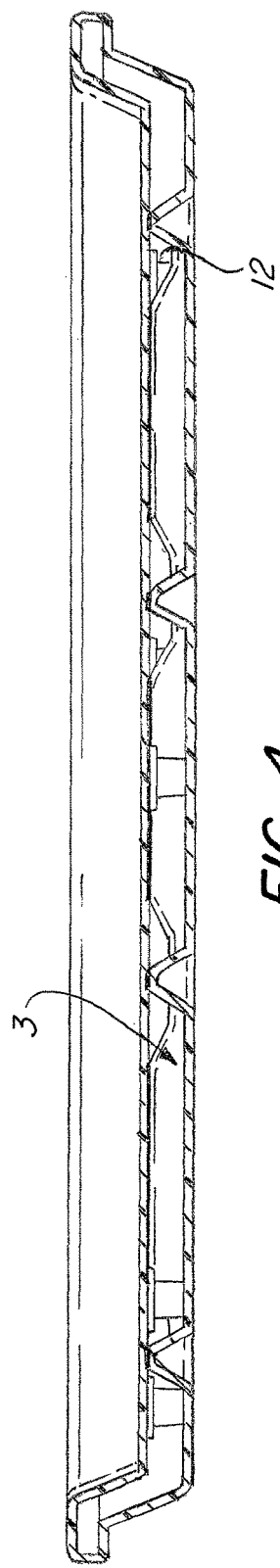
FIG. 4 is a section view of the blow molded part of FIG. 1 part along line 4-4 as shown in FIG. 3.
Figure 5:
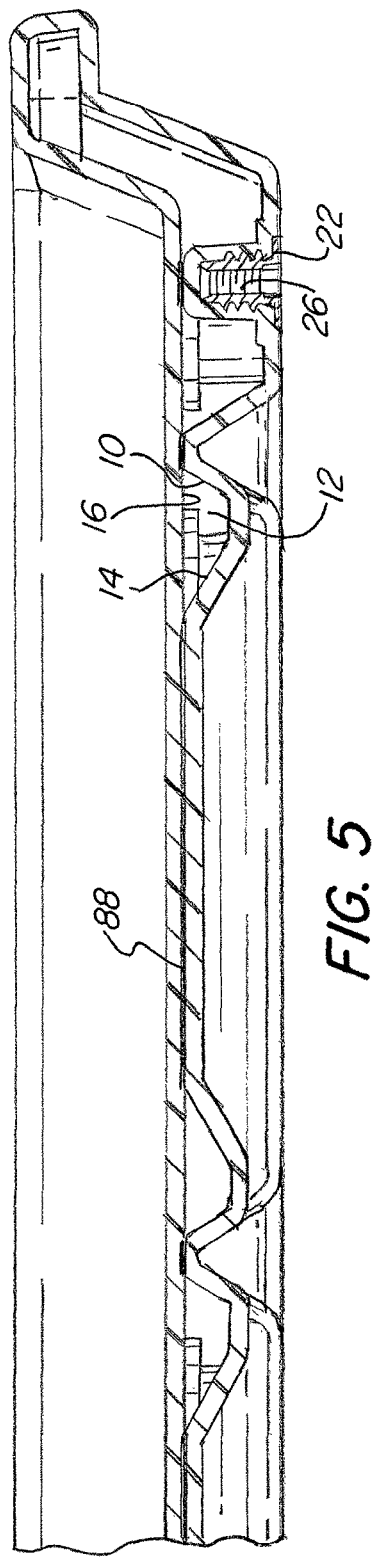
FIG. 5 is a section view of the blow molded part of FIG. 1 part along line 5-5 as shown in FIG. 3.
Figure 6:
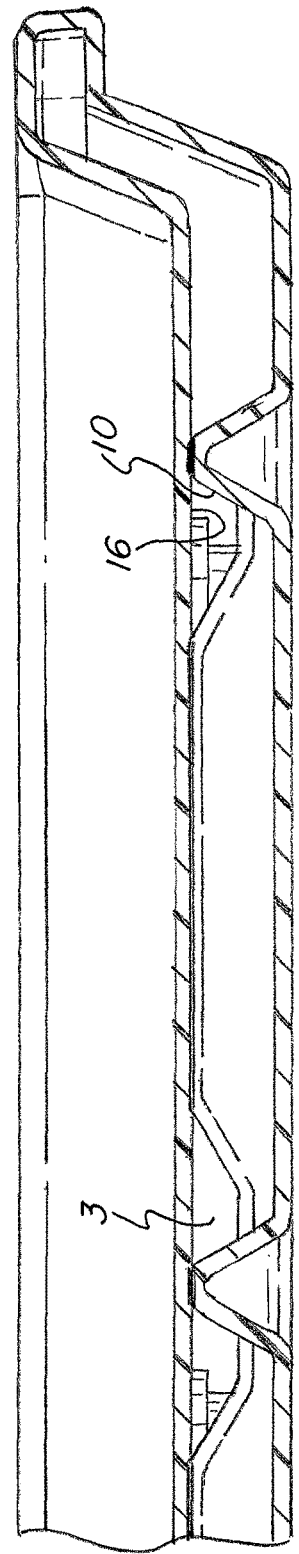
FIG. 6 is a section view of the blow molded part of FIG. 1 part along line 6-6 as shown in FIG. 3.
Figure 7:
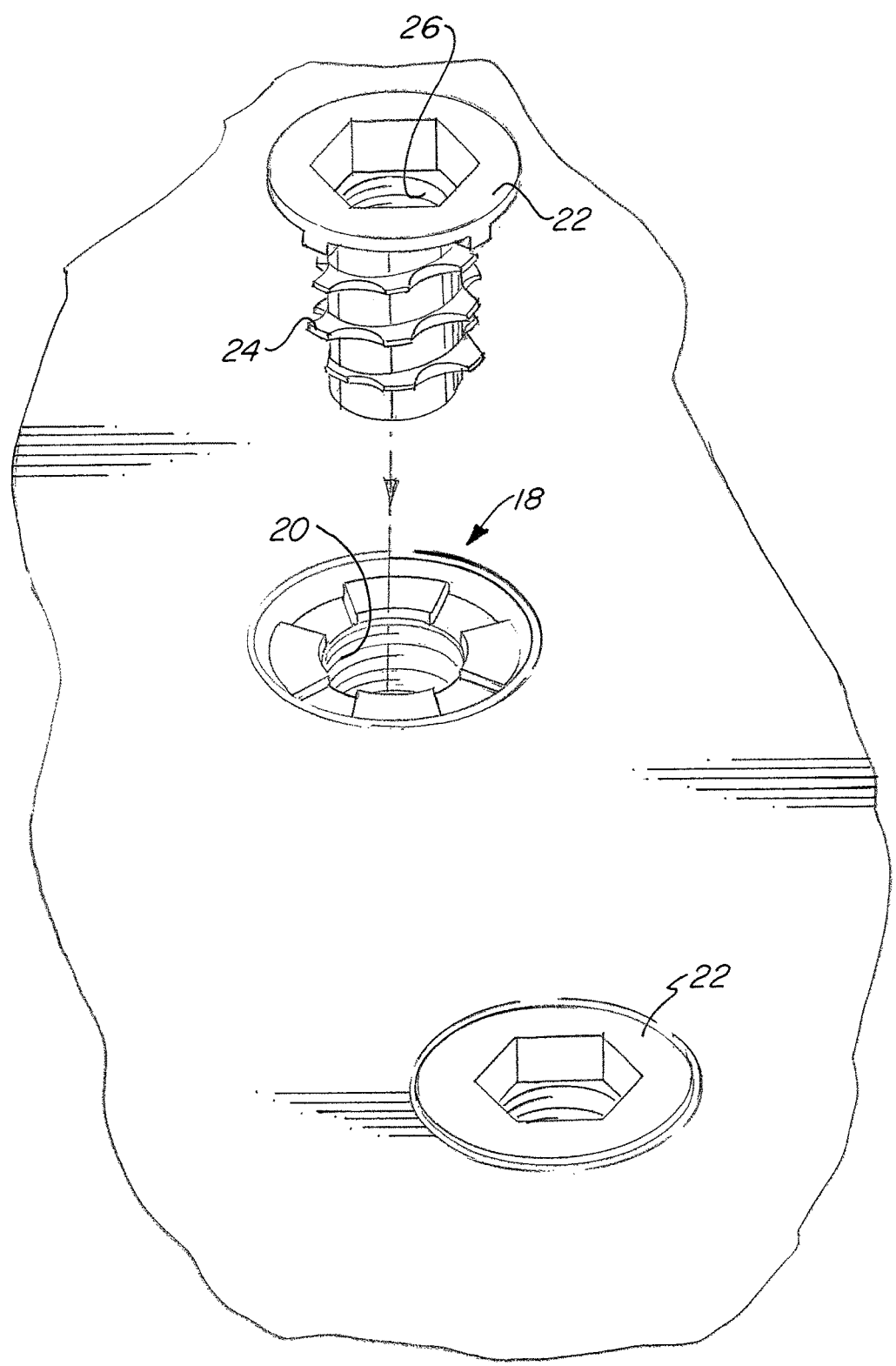
FIG. 7 is a detail view of the blow molded part of FIG. 1.

Referring now to the drawings, wherein like reference numerals designate corresponding structure throughout the views. The following examples are presented to further illustrate and explain the present invention and should not be taken as limiting in any regard.

FIGS. 1-7 show an exemplary blow molded structure 1 having a first wall 2 and a second wall 4 which surround a cavity 3. The second wall includes intersecting ribs 6, 8. As can be seen rib 6 generally extends width wise across the blow molded structure and the structure includes a number of these ribs arranged in parallel orientations. Rib 8 is positioned perpendicular to rib 6 and therefore arranged along intersecting paths. Rib 8 is positioned between rib 6 and rib 6 and rib 8 terminates in a way that allows fluid to flow along the interior sidewall 10 of rib 6. The fluid flows through passage 12 which is bounded by the interior sidewall 10, the interior end wall 14 of rib 8', and the interior surface 16 of the first wall 2. Each of ribs 8' and 8" define a similar passage such that fluid can flow substantially unobstructed along the length of rib 6.

The length 80 of rib 8 may be less than 50% of the length 60 of rib 6. Further, the spacing 82 between ribs 8 and 8' may be in the range of 0.75-2.5 times the length 80 or rib 8. In preferred embodiments, the length 80 is 25% of length 60 and the ribs 8, 8' and 8" are evenly spaced along rib 6 such that the spacing 82 is approximately equal to length 80.

The structure 1 may further include fluid inlet holes 17, 17' positioned on either end of rib 6 along the width of the structure 1. In some embodiments, the fluid inlet holes are positioned in line with the rib along the depth of the structure 1 and in some embodiments, the fluid inlet holes are positioned between the ribs along the depth of the structure 1.

The ribs 6, 8 are formed by an indent in the second wall which forms the sidewalls and end walls of the ribs. Further, the ribs define sections 66, 88 where the first 2 and second 4 walls are joined together in a plastic weld. The weld occurs during the molding process as the heated parison is compressed between the mold halves in the areas of the mold that define the rib.

The structure 1 further includes recesses 18 which in the embodiment shown include a cylindrical wall 20. The cylindrical wall 20 may be threaded, but the cylindrical wall 20 may also be smooth. Metallic inserts 22 include external threads 24 and an internally threaded hole 26. The external threads 24 may be relatively coarse and discontinuous. After molding, these inserts 22 are screwed into the recess 18 such that the external threads 24 engage the cylindrical wall 20. Alternate embodiments of the metallic inserts and recesses are shown and described in U.S. Pat. No. 9,028,185, the content of which is incorporated herein by reference.

As can be seen, the recess/inserts are found in both the first 2 and second 4 walls. This allows the structure to be affixed to other parts via bolts that secure to the internal threads of the hole 26. In one exemplary embodiment, the blow molded structure 1 is configured as a tray for a scale used at checkout stands and the inserts embedded in the second wall 4 secure to the scale whereas the inserts embedded in the first wall 2 secure to another part such as a bagging rack or in some cases a conveyor belt assembly.

Figure 8:
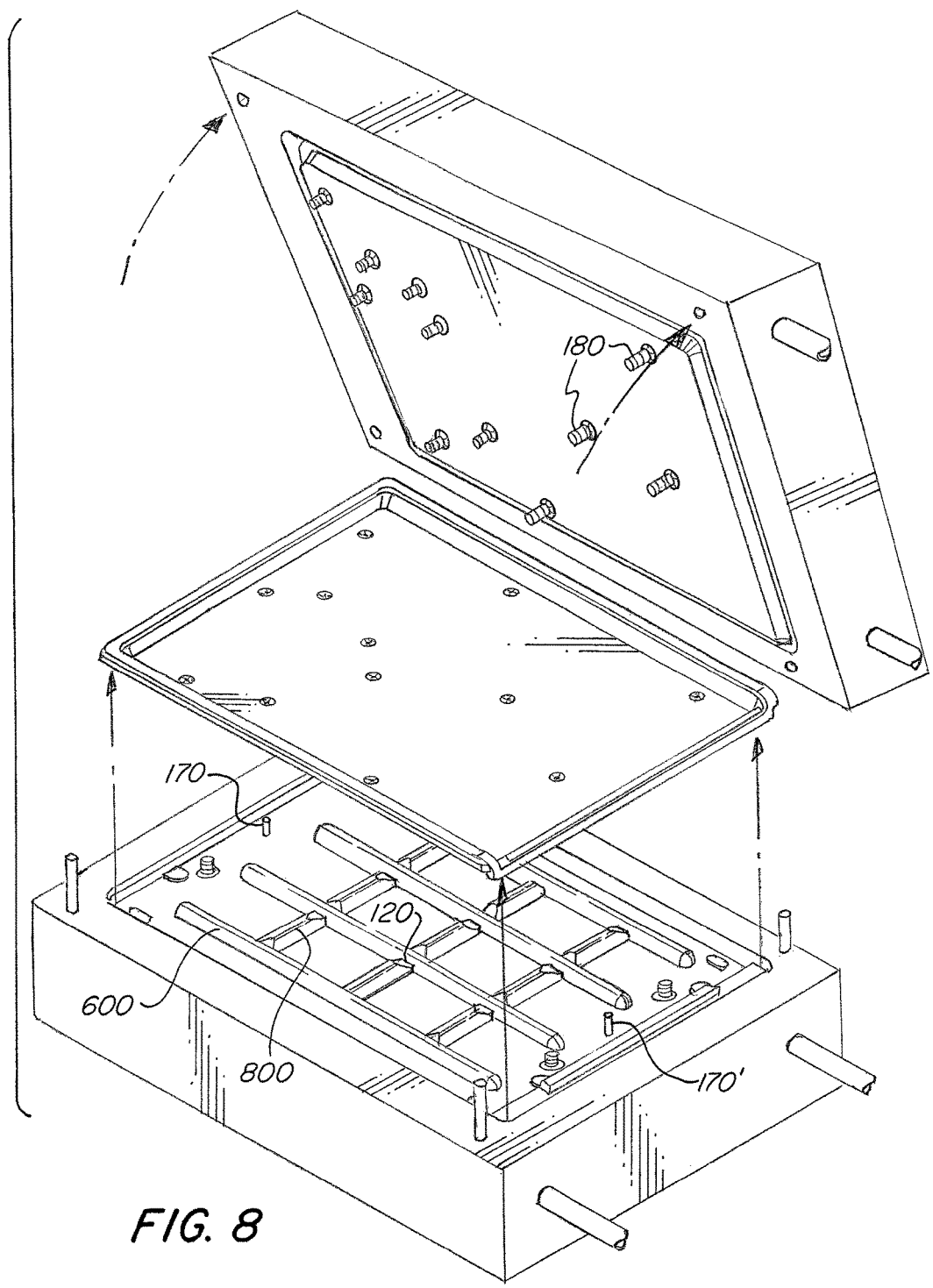
FIG. 8 is a perspective view of a mold used to manufacture the blow molded part of FIG. 1.

As shown in FIG. 8, the structure 1 is created using a mold that is the reverse image of the structure 1. A parison, which may be generally in the shape of a pillow is heated such that it is softened and is then placed between the mold halves. The mold halves are closed and the fluid trapped inside the parison causes the parison to press against the mold in most locations. To ensure that the plastic of the parison contacts the mold in all locations fluid (such as air) is introduced into the parison via the fluid inlet tubes 170, 170'. The mold may first close on the parison, forming the sections 66/88 of the ribs and the tubes 170, 170' may be movable up and down so that they can punch into the parison to create the inlet holes 17, 17'. The tubes may also be fixed. The timing of mold closing and introduction of fluid can be adjusted to be nearly simultaneous or sequentially spaced in time, depending on the particular application.

Protrusions 800 and 600 respectively correspond to the ribs 8 and 6. These protrusions in combination with the other side of the mold push together the parison in the locations where the ribs are formed. This creates the sections 66/88 which may also be referred to as welds. The space 120 between the protrusions 800, 600 allow for formation of the passage which likewise allows for the fluid to flow along the rib 6 during molding. This results in more uniform wall thicknesses by avoiding excessive wall thinning. Typically, the most thinning occurs at the last point fluid reaches or at corners. Thus, if the ribs 6/8 did not include the passage 12, an "X" shape would be formed with a closed intersection and there would be substantially more thinning at the area of the intersection, which could weaken the structure. By including the passage 12 between the intersecting ribs, fluid flows substantially unobstructed along the rib 6 and around rib 8 (via the passage 12 on either end thereof). This provides more uniform wall thicknesses (les localized thinning) than if the passages 12 did not exist. In addition protrusions 180 are located in the mold to provide the recesses 18 that receive the inserts 22. The mold halves typically close together along a straight axis.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A blow molded structure comprising:
    a first wall and a second wall;
    a cavity located between the first and second walls and defining an interior of the blow molded structure;
    a first rib defined by an indent in the second wall and including a first section where interior surfaces of the first and second walls are in contact, the first rib further defining an interior sidewall adjacent to the first section;
    a second rib transverse to said first rib, said second rib defined by another indent in the second wall and including a second section where the interior surfaces of the first and second walls are in contact, the second rib defining an interior end wall adjacent to the second section, said first and second ribs intersect;
    a passage defined within said cavity and located between the first and second sections, said passage allowing fluid flow along the interior sidewall within the cavity.

2. The blow molded structure of claim 1 wherein a cross section of said passage taken through said second section is bounded at least by an interior of the first wall, the interior sidewall of the first rib and the interior end wall of the second rib, the interior sidewall and the interior end wall of the second rib intersecting an interior face of the second wall at an indented portion of the second wall.

3. The blow molded structure of claim 1 wherein the interior surfaces of the first and second walls at the first and second sections are joined together to create joints.

4. The blow molded structure of claim 3 wherein the joints are plastic welds.

5. The blow molded structure of claim 1 further comprising:
    a plurality of first ribs arranged parallel to each other;
    a plurality of second ribs arranged parallel to each other;
    a plurality of passages each defined where one of the plurality of first ribs and one of the plurality of second ribs which intersect.

6. The blow molded structure of claim 1 further comprising at least one recess positioned in said first wall, said second wall or combinations thereof, said at least one recess defining a wall and an opening.

7. The blow molded structure of claim 6 wherein said at least one recess is configured to receive a metallic insert therein, the metallic insert having a threaded bore and external threads, the external threads configured to thread into said wall via said opening.

8. The blow molded structure of claim 1 further comprising at least two recesses each defining an opening, one of said recesses positioned in said first wall and one of said recesses positioned in said second wall.

9. The blow molded structure of claim 8 wherein each of said at least two recesses is configured to receive one of at least two metallic inserts therein, each metallic insert having a threaded bore and external threads configured to thread into one of the at least two recesses via said opening.

10. The blow molded structure of claim 5 further comprising at least one recess positioned in said first wall, said second wall or combinations thereof and spaced away from said plurality of first ribs and said plurality of second ribs, said at least one recess including a cylindrical wall.

11. The blow molded structure of claim 10 wherein said at least one recess is configured to receive a metallic insert therein, the metallic insert having a threaded bore and external threads, the external threads configured to thread into said cylindrical wall.

12. A blow molded structure comprising:
    a first wall and a second wall;
    a cavity located between the first and second walls and defining an interior of the blow molded structure;
    a first rib defined by an indent in the second wall and including a first section where interior surfaces of the first and second walls are in contact, the first rib further defining an interior sidewall adjacent to the first section;
    a second rib transverse to said first rib, said second rib defined by another indent in the second wall and including a second section where the interior surfaces of the first and second walls are in contact, the second rib defining an interior end wall adjacent to the second section;
    a passage defined within said cavity and located between the first and second sections, said passage allowing fluid flow along the interior sidewall within the cavity
    a first length of the first rib defined as a length of the first section, which is greater than a width of the first section;
    a second length of the second rib defined as a length of the second section, which is greater that a width of the second section;
    two of said second ribs spaced apart a distance greater than the second length and less than two thirds the first length.

13. The blow molded structure of claim 12 wherein said first length is at least three times larger than said second length.

14. A blow molded structure comprising:
    a first wall and a second wall;
    a cavity located between the first and second walls and defining an interior of the blow molded structure;
    a first rib defined by an indent in the second wall and including a first section where interior surfaces of the first and second walls are in contact, the first rib further defining an interior sidewall adjacent to the first section;
    at least two second ribs each transverse to said first rib, each second rib defined by another indent in the second wall and including a second section where the interior surfaces of the first and second walls are in contact, each second rib defining an interior end wall adjacent to the second section;

a first passage defined within said cavity and located between the first and second sections of the first ribs and a first one of the second ribs;

a second passage defined within said cavity and located between the first and second sections of the first rib and a second one of the second ribs, said first and second passages allowing fluid flow along the interior sidewall within the cavity;

said first rib being at least as long as a distance between the first and second passages.

15. The blow molded structure of claim 14 wherein a cross section of said first passage taken through said second section is bounded at least by an interior of the first wall, the interior sidewall of the first rib and the interior end wall of first one of the second ribs, the interior sidewall and the interior end wall of the second one of the second ribs intersecting an interior face of the second wall at an indented portion of the second wall.

16. The blow molded structure of claim 14 wherein the interior surfaces of the first and second walls at the first and second sections are joined together to create joints.

17. The blow molded structure of claim 16 wherein the joints are plastic welds.

18. The blow molded structure of claim 14 further comprising at least one recess positioned in said first wall, said second wall or combinations thereof, said at least one recess defining a wall and an opening.

19. The blow molded structure of claim 18 wherein said at least one recess is configured to receive a metallic insert therein, the metallic insert having a threaded bore and external threads, the external threads configured to thread into said wall via said opening.

20. The blow molded structure of claim 14 further comprising at least two recesses each defining an opening, one of said recesses positioned in said first wall and one of said recesses positioned in said second wall.

21. The blow molded structure of claim 20 wherein each of said at least two recesses is configured to receive one of at least two metallic inserts therein, each metallic insert having a threaded bore and external threads configured to thread into one of the at least two recesses via said opening.

* * * * *